United States Patent [19]
Araki

[11] Patent Number: 5,525,267
[45] Date of Patent: Jun. 11, 1996

[54] TAMPER RESISTANT LIMIT CAP

[75] Inventor: Satoru Araki, Ebina, Japan

[73] Assignee: U.S.A. Zama, Inc., Franklin, Tenn.

[21] Appl. No.: 236,364

[22] Filed: Apr. 29, 1994

[30] Foreign Application Priority Data

Apr. 30, 1993 [JP] Japan .................... 5-127988

[51] Int. Cl.⁶ ..................................... F02M 3/08
[52] U.S. Cl. .................. 261/71; 261/DIG. 38; 137/382
[58] Field of Search ............ 261/DIG. 38, 71; 137/382

[56] References Cited

U.S. PATENT DOCUMENTS

| | | |
|---|---|---|
| 2,829,538 | 2/1953 | Mueller . |
| 3,453,897 | 2/1964 | Adinolfi . |
| 3,618,906 | 11/1971 | Charron . |
| 4,097,561 | 6/1978 | Seki et al. . |
| 4,271,095 | 6/1981 | Maeda . |
| 4,283,353 | 8/1981 | Miller . |
| 4,333,891 | 6/1982 | Miller . |
| 4,762,144 | 8/1988 | Ford . |
| 5,055,238 | 10/1991 | Araki . |
| 5,236,634 | 8/1993 | Hammett et al. . |
| 5,252,261 | 10/1993 | Gerhardy .......... 261/DIG. 38 |
| 5,322,645 | 6/1994 | Hammett et al. .......... 261/DIG. 38 |

FOREIGN PATENT DOCUMENTS

| | | | |
|---|---|---|---|
| 2352955 | 9/1974 | France ............ 261/DIG. 38 |
| 2401803 | 9/1974 | Germany ............ 261/DIG. 38 |
| 2548226 | 5/1976 | Germany . |

*Primary Examiner*—Tim R. Miles
*Attorney, Agent, or Firm*—Lyon & Lyon

[57] ABSTRACT

A tamper resistant limit cap for a carburetor having manual adjust valves that are able to adjust the effective area of the main fuel passage and the slow speed fuel passage. The cap covers tightly on the head part of the main fuel adjust valve and includes a flange attached to the outside of the cap that abuts a stop upon rotation of the cap, a guide flange attached to the outside of the cap to locate, upon installation, the final position of the cap, and two projections on the inside of cap to prevent removal of the cap from valve head part or independent rotation of the cap and head part relative to each other.

8 Claims, 1 Drawing Sheet

TAMPER RESISTANT LIMIT CAP

FIELD OF INVENTION

This invention is related to a manually adjustable fuel valve of a carburetor that supplies fuel to utility engines used as power sources for agricultural machinery, gardening machinery and light vehicles, and more particularly to a tamper resistant limit cap that facilitates control over the range in which the valve can be adjusted.

BACKGROUND OF THE INVENTION

The fuel flow of utility engine carburetors is a very small volume as compared to the fuel flow volume of a four-cycle automobile carburetor. Relatively big variations in fuel flow occur due to differences in dimensional accuracy and part quality within the carburetors. Also, engines that receive fuel via a carburetor have different individual performance characteristics. Therefore, adjustments are needed to correct fuel flow for each engine and each carburetor.

For the above reasons, a diaphragm or float type carburetor can adjust the fuel flow with a manual adjust valve by changing the effective area of passage to the main nozzle, the slow port, or the idle port, from the metering chamber. (U.S. Pat. No. 3,404,872, Japan 47-21848).

The manual adjust valves comprise a needle shaped design that changes the effective area of fuel passage proportionally to the rotation of a male screw that is installed within a female receptacle of the carburetor body. A valve head, that projects outside of the carburetor, is used to rotate the screw, and thus adjust the tip of the valve needle inside the carburetor from the outside of the carburetor. Basically, the engine and carburetor manufacturer, along with the consumer operator, can adjust the fuel flow by adjusting the manual adjust valve.

However, most consumer operators are not familiar with the delicate operation of a manual adjust valve. The instructions say "don't adjust slow speed adjust valve for idle and starting." Yet, in many cases the main adjust screw is reset by a consumer usually trying to improve the temporary poor performance of the engine due to the effects of temperature and altitude. As a result, difficulties arise such as the engine looses power, the engine will not start, or the engine exhaust composition worsens.

Moreover, emission regulations have recently been enacted for utility engines that require that the consumer not be able to operate the adjust valve beyond the limited range set by the manufacturer. Therefore, the regulations require a limit device that allows the consumer to operate the adjust valve within the emission regulation limits. In addition, the regulations require a design for a limit device that is very difficult to remove.

Currently, the limit device for the adjust valves includes a cap with a flange. The cap is installed on the head part of the needle by a tight fit. The slow adjust valve acts as a stopper for the flange of the cap. However, the current cap design can be removed from the head part by pulling in the axial direction exposing the end of the head part, thereby making it possible to rotate the adjust valve beyond the required limits. Even the flange contact stopper is easy to remove. Therefore, it would be desirable to have a reliable limit device that does not allow the consumer to operate the adjust needle beyond the emission regulations.

SUMMARY OF THE PRESENT INVENTION

The tamper resistant limit cap of the present invention serves to limit the adjustment of the fuel valve on the fuel flow passage of the carburetor, which runs from the metering chamber to the air intake, to maintain the emissions from the engine within the regulations. Limiting the adjustment of the fuel valve is accomplished by installing a cap that covers tightly on the head part of the main adjust valve.

According to an exemplary embodiment of the present invention, the cap includes a cylindrical wall. Inside the cap on the cylindrical wall are one or more projections in the axial direction of the adjust valve. The inside diameter created by these projections is smaller than the diameter of the head part. The head part of the main adjust valve, has a holding groove that holds onto one of the projections inside the cap, along with a set of knurls in the axial direction of the adjust valve. Attached to the cap's cylinder wall is an end wall at one end. The end wall has a slot hole in which the slot is wider than the center hole. The slot hole is fitted to the tool groove on the end of the head part. On the outside of the cap is a guide flange and a flange that contacts the slow adjust valve. The guide flange fits an escape groove on the head part of the slow adjust valve.

In operation the carburetor manufacturer adjusts the main fuel valve for the correct effective opening area, and then installs the cap on the head part temporarily. The first projection inside the cap holds the holding groove of the head part to prevent the cap from falling off the adjust valve. In this temporary position the cap and the head part are freely rotatable independent of one another. The engine manufacturer then adjusts the fuel valve by measuring the percentage of CO in the emission or some other procedure that will meet the emission specifications. After the fuel valve is adjusted to meet the emission specifications, the cap is rotated to a position where the needle valve cannot b e rotated in the rich direction because the flange of the cap is in contact with the slow adjust valve head part. Preferably the cap has a guide flange and the head part of the slow fuel adjust valve has an escape groove. Such a configuration allows the engine manufacturer to install a cap to a final position without having to adjust the flange position of the cap.

The cap is then installed by pushing it onto the head part. At this time the first projection inside the cap holds the knurls on the head part, the second projection holds the holding groove on the head part, and the flange of the cap contacts the slow adjust valve head part. It is possible to rotate the main adjust valve, together with the cap, to the lean direction with a small screwdriver only, within a 360 degree angle of rotation. But, the main adjust valve can not be rotated in the rich direction because the slow adjust valve head part stops the flange of the cap.

If the cap has a circular hole at the center of the slot hole and the head part has a narrow tool groove, only a screwdriver that is small enough in diameter to pass through the circular hole and thin enough to fit the narrow tool groove can approach the needle valve. It is possible to rotate the needle valve in the lean direction with a small, thin screwdriver, but it is not possible to rotate in the rich direction because the small thin screwdriver will fail against the large rotating torque required to overcome the stopper. If the cap has a guide flange and the head part slow fuel adjust valve has an escape groove, the engine manufacturer can install a cap to a final position without having to adjust the flange position of the cap.

And object of this invention is to provide an improved tamper resistant limit cap.

Another object of this invention is to provide an improved tamper resistant limit cap that is a reliable limit device that does not allow the consumer to operate the adjust valve beyond the emission regulations.

Further objects and advantages of this present invention will become apparent from a consideration of the drawings and ensuing description.

DESCRIPTION OF THE PREFERRED EMBODIMENT

Figure 1:
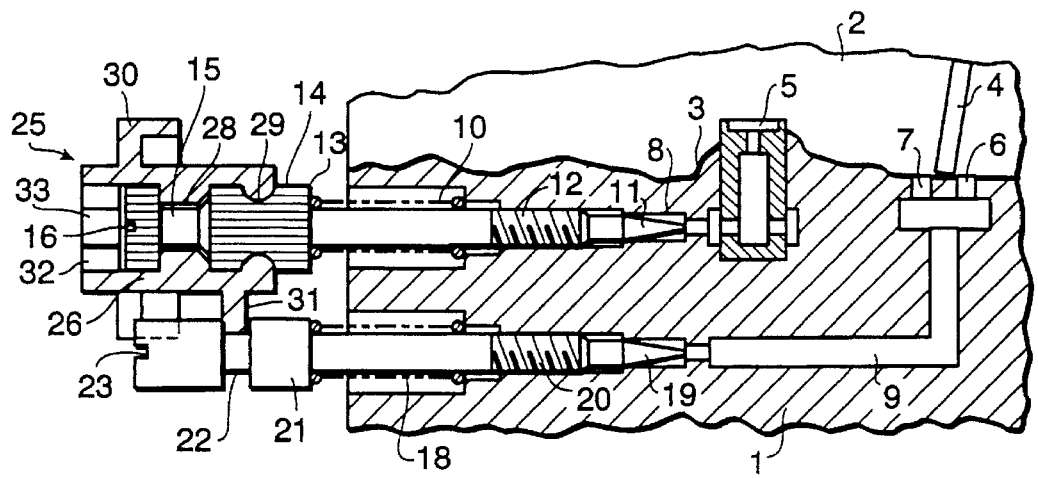
FIG. 1 is a sectional view of a preferred embodiment of a tamper resistant limit cap mounted on a carburetor valve assembly.
Figure 2:
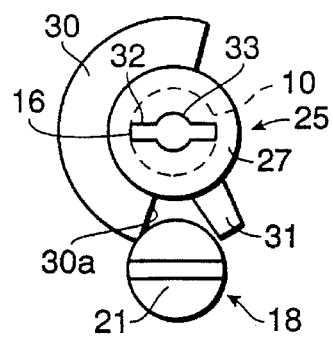
FIG. 2 is a end view of the tamper resistant limit cap mounted on a carburetor valve assembly.
Figure 3:
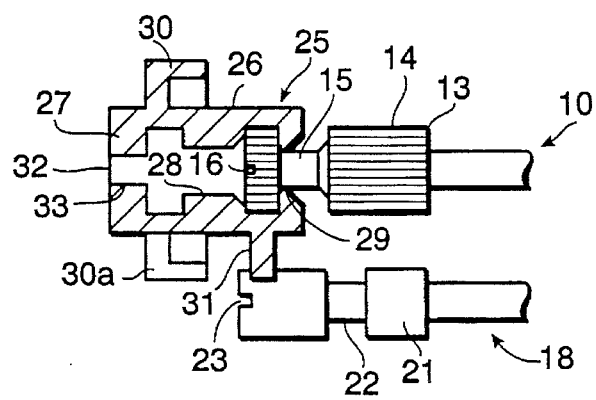
FIG. 3 is a fragmentary view of the assembly depicted in FIG. 1 showing a tamper resistant limit cap in its shipping or pre-final installation position.

Referring now in detail to the drawings, there is illustrated a novel tamper resistant limit cap. Referring to FIGS. 1, 2, and 3 adjust valves 10 and 18 are shown installed parallel to each other in a main fuel passage 8 and a slow fuel passage 9, respectively. The passages 8 and 9, respectively, run from the metering chamber of the diaphragm, or float type carburetor, to a main nozzle 5 that is open to venturi 3 and 2, and to idle and slow ports 6 and 7 that are open to the side of a throttle valve 4.

The adjust valves 10 and 18 comprise needle valves 11 and 19 within the fuel passages 8 and 9, male screws 12 and 20, for moving the needle valve 11 and 19, screwed into threaded female receptacles in the carburetor body 1, and head parts 13 and 21 projecting outside the carburetor body 1. The head part 13 of the adjust valve 10 in tie main fuel passage 8 has parallel knurls 14 located in the axial direction on the head part's 13 outer round surface. Also, the head part 13 has a circular holding groove 15 and a tool groove 16 on its end surface. The head part 21 of the adjust valve 18 in the slow fuel passage 9 has a circular escape groove 22.

In the preferred embodiment, a cap 25, acting as a limit device, is constructed from plastic. Preferably, the cap 25 includes a cylindrical wall 26, that has a little bigger inside diameter than the outside diameter of the head part 13 of the adjust valve 10. Two projections 28 and 29 are attached to the inside of the cylinder wall 26 and spaced in the axial direction. On the outside of the cylinder wall 26, there is a flange 30 that extends approximately 180 degrees about the circumference of the cylinder wall 26, and a stick shaped guide flange 31. An end wall 27 is attached to the cylinder wall 26. The end wall 27 has a slot hole 32 for approaching the tool groove 16 in the head part 13. The slot hole 32 is wider than the circular hole 33 in the center of the end wall 27.

The projections 28 and 29 are attached on the inside of the cylinder wall 26 symmetrically to each other. The axial distance between the first projection 29 and the second projection 28 is the same as the distance between the holding groove 15, of the head part 13, and the end of the adjust valve 10, as seen in FIG. 3. The flange 30 is installed hear the end wall 27 and the guide flange 31 is installed near the open end of the cap 25, between the end of the flange 30 and the head part 21 of the adjust valve 18 in the slow fuel passage 9 as seen in FIG. 1.

Prior to operation, the carburetor manufacturer adjusts the fuel valve 18 for idle and the fuel valve 10 for part and wide open throttle. Before shipping to the engine manufacturer, the cap 25 is installed on the head part 13 of the adjust valve 10. At this time, the first projection 29 is fit into the holding groove 15, making the cap 25 not easily removable from the head part 13, as seen in FIG. 3.

The carburetor manufacturer ships the above configuration to the engine manufacturer. The engine manufacturer assembles this carburetor on the engine, then adjusts the fuel valve 10, to run at wide open throttle while measuring the CO percentage in the emission. An example of a target percentage of CO is five percent. The engine manufacturer may use some other proven procedure to assure that the engine will meet the emission specifications.

This adjustment of the main fuel adjust valve is done with a small screwdriver that is able to pass through the circular hole 33 to the tool groove 16. The cap 25 is installed on the fuel valve 10, as seen in FIG. 3, such that the cap 25 and the head part 13 can temporarily rotate independently of one another. The adjust valve 10 is able to be rotated with a small amount of torque, so a small screwdriver can adjust the fuel needle even though the screwdriver only fits the center part of the tool groove 16.

After adjusting the engine speed with the adjust valve 10, so that the emissions are within specification, the cap 25 is pushed onto the head part 13 after the flange end 30A of the flange 30 is located to contact the head 21 of the adjust valve 18, as seen in FIG. 2. Preferably the cap 25 has a guide flange 31 and the head part 21 of the slow fuel adjust valve 18 has an escape groove 22. Such a configuration allows the engine manufacturer to install the cap 25 to a final position without having to adjust the flange 30 position of the cap 25.

The cap 25 is then pushed completely on to the head part 13 such that the second projection 28 is fitted to the holding groove 15, which prevents the pulling off of the cap 25, and the first projection 29 fits the knurls 14, which prevents individual rotation of the cap 25 and the head part 13, relative to each other, as seen in FIG. 1. This operation fixes the cap 25 on the adjust valve 10 firmly and places the guide flange 31 into the escape groove 22 of the head part 21 of the slow fuel adjust valve 18. The escape groove 22 allows the guide flange 31 of the cap 25 to pass freely as the cap 25 is rotated in the lean direction.

After the cap 25 is firmly installed, the tool slot 16 of the adjust valve 10 and the slot hole 32 of the cap 25 are usually not aligned with each other. The consumer of the machines or small vehicle cap approach the tool groove 16 with a small screwdriver that can pass through the circular hole 33. Therefore, the adjust valve 10 can be rotated with the same small amount of torque that was required before firmly installing the cap 25. The adjust valve 10 can be rotated only in the lean adjust direction such that the flange 30, at flange end 30A, goes away from the head part 21 in a clockwise direction until the opposite end of the flange 30 contacts the head 21 (see FIG. 2). But, the consumer cannot rotate the adjust valve in the too rich direction with the small screwdriver because the flange end 30A is stopped by the head part 21 and the rotation torque necessary to rotate the cap 25 to destroy the knurls 14 is too big to be exerted with the small screwdriver.

The guide flange 31 allows for easy operation for final installation of the cap 25, because the guide flange 31 always holds the cap 25 where the flange end 30A contacts the head 21 (same as final position).

Also, when the cap 25 is temporarily installed, the adjust valve 10 can be rotated with any relation to the cap 25 with a small amount of torque. The guide flange 31 can be installed on the same circle as flange 30.

In another embodiment of the cap 25 the guide flange 31 is eliminated. If the cap 25 does not have a guide flange 31, and further, the flange 30 does not contact the head 21 when the cap 25 is temporarily installed, a normal screwdriver can approach the tool groove 16 through the slot hole 32 in the end wall 27 of the cap 25 and make adjustments. However, the width of the tool groove 16 comprising a slot having a length and a width is too narrow for a normal screwdriver. When temporarily installing the cap 25, only a small screwdriver can pass through the circular hole 33, of the slot hole 32, in the center of the end wall 27 and adjust the fuel valve 10 in the rich and lean directions. Therefore, only those who have a small screwdriver, which can pass through the circular hole 33 and fit the narrow tool groove 16 can adjust the fuel valve 10 after the temporary installation of the cap 25. Normal commercial screwdrivers, that most have, cannot make the adjustments. A normal big screwdriver can rotate the fuel valve 10 and the cap 25 together, by the slot hole 32 of the cap 25, in only the lean direction.

After the final installation of the cap 25, it is difficult to rotate the adjust valve 10 with a small screwdriver through the circular hole 33 strongly enough to force the knurl 14 past the first projection 29. Another embodiment achieves the same effect of having flange 30 bear against the adjust valve 18, as a stopper, with a cap 25 having a cylinder wall 26, but no end wall 27.

In the above embodiments, only the adjust valve 10 has a limit device. However, in an additional embodiment, the same limit device can also be installed on the other adjust valve 18 in the slow fuel passage 9.

Thus, it should be noted that it is convenient to ship the carburetor with the cap 25 already temporarily installed, so the engine manufacturer can adjust the fuel valve 10 before final installation of the cap 25. After final installation it is only possible to rotate the valve 10 in the lean direction from a predetermined position by the engine manufacturer. It is also difficult to remove the cap 25 as a limit device from the adjust valve 10 because the first projection 29 holds the knurls 14 of the valve 10 firm and the second projection 28 holds the groove 15 firm. Therefore, after final installation the operator can adjust the fuel valve 10 in only the lean direction within the emission regulations.

If the end wall 27 on the cap 25 has a circular hole 33 at the center of the slot hole 32, the usable adjustable tools are limited. This configuration prevents malicious excessive operation and improves reliability. Also, if the cap 25 has a guide flange 31 it makes it easy to install the cap 25 and increases productivity.

Thus, the tamper resistant limit cap of the present invention provides many benefits over the prior art. While the above description contains many specificities, these should not be construed as limitations on the scope of the invention, but rather as an exemplification of the preferred embodiments thereof. Many other variations are possible. Accordingly, the scope of the present invention should be determined not by the embodiments illustrated above, but by the appended claims and their legal equivalents.

What is claimed is:

1. For a carburetor having manual adjust valves that are able to adjust the effective area of a main fuel passage and a slow speed fuel passage of the carburetor, the manual adjust valves being installed nearly adjacent and parallel to each other, the slow speed fuel passage manual adjust valve having a head part being adapted to act as a stopper, the main fuel passage manual adjust valve including a head part having a holding groove and knurls located in an axial direction on the head part's surface, a limiting device comprising a generally cylindrical cap that covers the head part of the main fuel passage manual adjust valve, a flange fixedly attached to the exterior of said cap, said flange abuts the slow speed fuel passage manual adjust valve upon rotation of said cap, first and second projections attached in an axial direction to the inside of said cap therein creating an inside diameter of said cap which is smaller than the outside diameter of the head part of the main fuel passage manual adjust valve, said second projection being attached near the end of said cap furthest from the carburetor and being fixedly receivable in the holding groove on the head part of the main fuel passage manual adjust valve, and, said first projection being attached near the end of said cap closest to the carburetor and being fitted to the knurls on the head part of the main fuel passage manual adjust valve, and an end wall that encloses the end of said cap furthest from the carburetor, said end wall having a slot hole and a circular hole in the center of the slot hole wherethrough a tool groove, comprising a slot adapted to receive a small screwdriver, in the head part of the main fuel passage manual adjust valve can be approached, the width of the tool groove being narrower than the width of said slot hole.

2. The limiting device of claim 1, wherein said cap further comprises a guide flange fixedly attached to the exterior of said cap, said guide flange being received in an escape groove in the head part of the slow speed fuel passage manual adjust valve as said second projection of said cap is fixedly received in the holding groove on the head part of the main fuel passage manual adjust valve.

3. For a carburetor having manual adjust valves that are able to adjust the effective area of a main fuel passage and a slow speed fuel passage of the carburetor, the manual adjust valves being installed nearly adjacent and parallel to each other, the slow speed fuel passage manual adjust valve having a head part being adapted to act as a stopper, the main fuel passage manual adjust valve including a head part having a holding groove and knurls located in an axial direction on the head part's surface, a limiting device comprising at least one cap attachable to the head part of the main fuel passage manual adjust valve, a flange fixedly attached to the exterior of said at least one, said flange abuts the slow speed fuel passage manual adjust valve upon rotation of said at least one, first and second projections attached in an axial direction to the inside of said at least one cap, said first projection being fitted to the knurls on the head part of the main fuel passage manual adjust value, said second projection being fixedly receivable in the holding groove on the head part of the main fuel passage manual adjust valve, and, an end wall that encloses the end of said at least one cap furthest from the carburetor, said end wall having a slot hole and a circular hole in the center of the slot hole wherethrough a tool groove, comprising a slot adapted to receive a small screwdriver, in the head part of the main fuel passage manual adjust valve can be approached, the width of the tool groove being narrower than the width of said slot hole.

4. For a carburetor having manual adjust valves that are able to adjust the effective area of a main fuel passage and a slow speed fuel passage of the carburetor, the manual adjust valves being installed nearly adjacent and parallel to each other, the slow speed fuel passage manual adjust valve being adapted to act as a stopper and including a head part having an escape groove, the main fuel passage manual adjust valve including a head part having a holding groove and knurls located in an axial direction on the head part's surface, a limiting device comprising

- a cap attachable to the head part of the main fuel passage manual adjust valve,
- a flange fixedly attached to the exterior of said cap, said flange abuts the slow speed fuel passage manual adjust valve upon rotation of said cap,
- first and second projections attached in an axial direction to the inside of said cap, said first projection being fitted to the knurls on the head part of the main fuel passage manual adjust valve, said second projection being fixedly receivable in the holding groove on the head part of the main fuel passage manual adjust valve, and,
- a guide flange fixedly attached to the exterior of said cap, said guide flange being received in the escape groove in the head part of the slow speed fuel passage manual adjust valve as said second projection of said cap is fixedly received upon final installation in the holding groove on the head part of the main fuel passage manual adjust valve.

5. The limiting device of claim 4, wherein said cap further comprises an end wall that encloses the end of said cap furthest from the carburetor, said end wall having a slot hole and a circular hole in the center of the slot hole wherethrough a tool groove, comprising a slot adapted to receive a small screwdriver, in the head part of the main fuel passage manual adjust valve can be approached, the width of the tool groove being narrower than the width of said slot hole.

6. For a carburetor having a manual adjust valve that is able to adjust the effective area of a main fuel passage in the carburetor, wherein the main fuel passage manual adjust valve includes a head part having a holding groove and knurls located in the axial direction on the head part's surface and the carburetor includes a stop having an escape groove therein, a limiting device comprising

- a generally cylindrical cap that covers the head part of the main fuel passage manual adjust valve,
- a flange fixedly attached to the exterior of said cap, said flange abuts the stop upon rotation of said cap,
- first and second projections attached in an axial direction to the inside of said cap therein creating an inside diameter of said cap which is smaller than the outside diameter of the head part of the main fuel passage manual adjust valve, said first projection being attached near the end of said cap closest to the carburetor and being fitted to the knurls on the head part of the main fuel passage manual adjust valve, said second projection being attached near the end of said cap furthest from the carburetor and being fixedly received in the holding groove on the head part of the main fuel passage manual adjust valve,
- an end wall that encloses the end of said cap furthest from the carburetor, said end wall having a slot hole with a circular hole in the center of the slot hole wherethrough a tool groove, comprising a slot adapted to receive a small screwdriver, in the head part of the main fuel passage manual adjust valve can be approached, the width of the tool groove being narrower than the width of said slot hole, add
- a guide flange fixedly attached to the outside of said cap, said guide flange being received in the escape groove in the stop as said second projection of said cap is fixedly received upon final installation in the holding groove on the head part of the main fuel passage manual adjust valve.

7. For a carburetor having a manual adjust valve that is able to adjust the effective area of a main fuel passage in the carburetor, wherein the main fuel passage manual adjust valve includes a head part having a holding groove and knurls located in the axial direction on the head part's surface and the carburetor includes a stop, a limiting device comprising

- a cap attachable to the head part of the main fuel passage manual adjust valve,
- a flange fixedly attached to the exterior of said cap, said flange abuts the stop upon rotation of said cap,
- first and second projections attached in an axial direction to the inside of said cap, and,
- a guide fixedly attached to the outside of said cap to position said cap.

8. The limiting device of claim 7, further comprising an end wall that encloses the end of said cap furthest from the carburetor, said end wall having a slot hole wherethrough a tool groove in the head part of the main fuel passage manual adjust valve can be approached.

\* \* \* \* \*

UNITED STATES PATENT AND TRADEMARK OFFICE
CERTIFICATE OF CORRECTION

PATENT NO. : 5,525,267
DATED : June 11, 1996
INVENTOR(S) : Satoru Araki

It is certified that error appears in the above-indentified patent and that said Letters Patent is hereby corrected as shown below:

```
Column 2, line 32, change "b e" to --be--.
Column 2, line 48, change "can not" to --cannot--.
Column 3, line 38, change "tie" to --the--.
Column 8, line 14, change "wail" to --wall--.
Column 8, line 20, change "add" to --and--.
```

Signed and Sealed this

Twenty-second Day of October, 1996

Attest:

BRUCE LEHMAN

*Attesting Officer*   *Commissioner of Patents and Trademarks*